(12) United States Patent
Hartung

(10) Patent No.: US 8,737,424 B2
(45) Date of Patent: May 27, 2014

(54) METHODS AND SYSTEMS FOR SUBSTITUTING PROGRAMS IN MULTIPLE PROGRAM MPEG TRANSPORT STREAMS

(75) Inventor: John Hartung, Mableton, GA (US)

(73) Assignee: ARRIS Enterprises, Inc., Suwanee, GA (US)

( * ) Notice: Subject to any disclaimer, the term of this patent is extended or adjusted under 35 U.S.C. 154(b) by 847 days.

(21) Appl. No.: 12/513,572

(22) PCT Filed: Nov. 6, 2007

(86) PCT No.: PCT/US2007/083711
§ 371 (c)(1),
(2), (4) Date: Jun. 30, 2010

(87) PCT Pub. No.: WO2008/058105
PCT Pub. Date: May 15, 2008

(65) Prior Publication Data
US 2010/0268835 A1    Oct. 21, 2010

Related U.S. Application Data

(60) Provisional application No. 60/864,504, filed on Nov. 6, 2006.

(51) Int. Cl.
*H04L 12/42*    (2006.01)

(52) U.S. Cl.
USPC .................. 370/454; 370/450; 370/456

(58) Field of Classification Search
USPC ............................. 370/450, 454, 456
See application file for complete search history.

(56) References Cited

U.S. PATENT DOCUMENTS

| | | | |
|---|---|---|---|
| 2003/0231644 A1* | 12/2003 | Guillemot et al. | 370/401 |
| 2004/0002969 A1* | 1/2004 | Perng et al. | 707/3 |
| 2005/0039064 A1* | 2/2005 | Balakrishnan et al. | 713/400 |
| 2005/0204385 A1* | 9/2005 | Sull et al. | 725/45 |
| 2005/0276284 A1* | 12/2005 | Krause et al. | 370/538 |
| 2006/0088052 A1* | 4/2006 | Sauser et al. | 370/466 |
| 2007/0195824 A9* | 8/2007 | Chapman et al. | 370/490 |

* cited by examiner

Primary Examiner — Phuoc Nguyen
(74) Attorney, Agent, or Firm — Troy A. Van Aacken

(57) ABSTRACT

Provided are methods and systems for substituting programs within an existing multi program transport stream (MPTS). Methods can include identifying a first packet associated with a first input program, determining if the first packet is a packet to be replaced, substituting a second packet for the first packet if the first packet is the packet to be replaced, and applying a timestamp at the stream processor to the second packet with a time for the second input program.

54 Claims, 9 Drawing Sheets

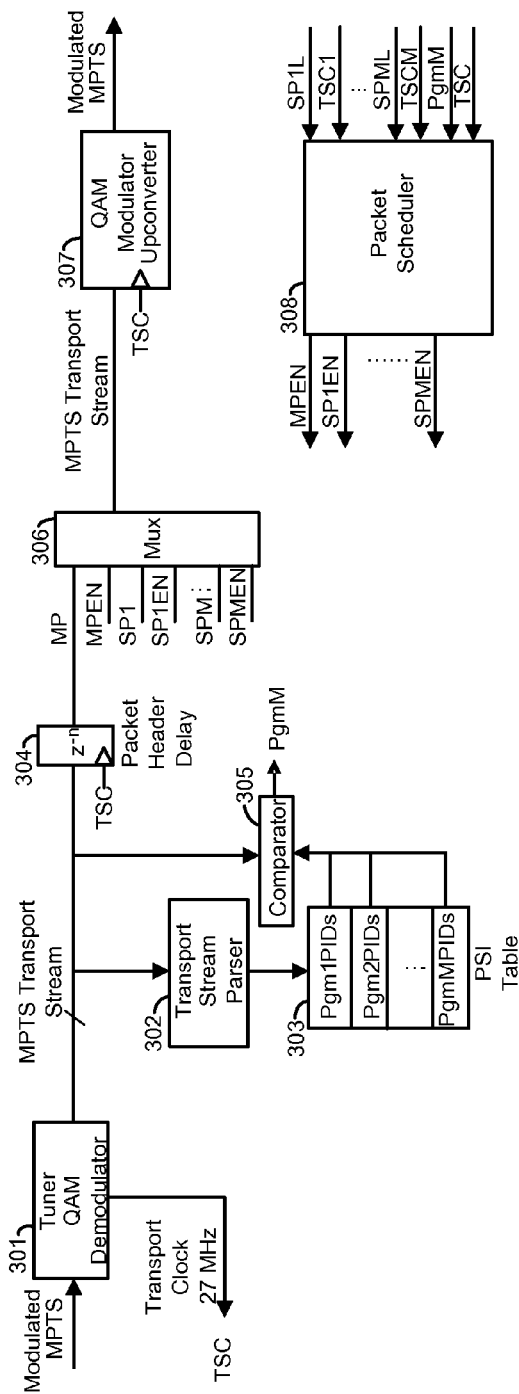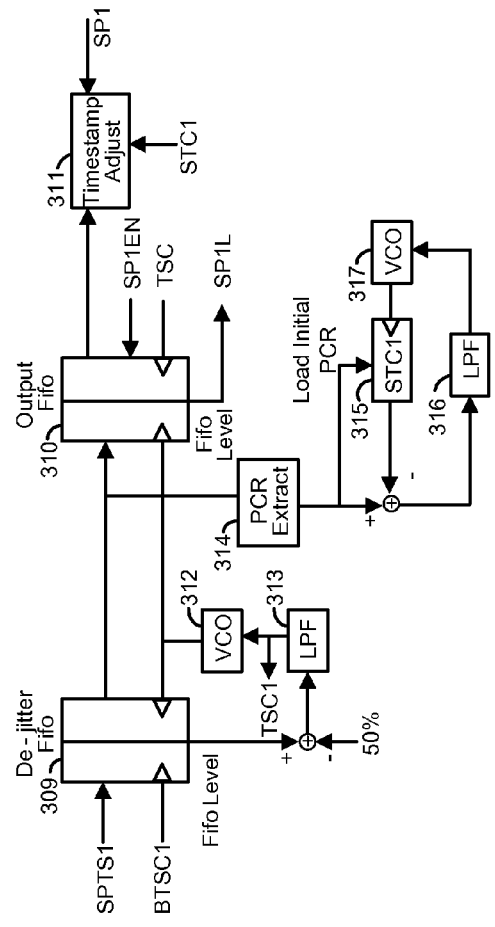
FIG. 3

METHODS AND SYSTEMS FOR SUBSTITUTING PROGRAMS IN MULTIPLE PROGRAM MPEG TRANSPORT STREAMS

CROSS REFERENCE TO RELATED PATENT APPLICATION

This application claims priority to U.S. Provisional Application No. 60/864,504 filed Nov. 6, 2006, herein incorporated by reference in its entirety.

BACKGROUND

Applications for MPEG transport have appeared that require the substitution of programs within Multiple Program Transport Streams (MPTS) without modification of the Program Specific Information (PSI). One example of such an application is the encoding of security cameras within a multiple dwelling unit (MDU). This analog video is currently being carried within the analog tier of cable television networks; however, these networks are being converted to all digital format which will necessitate the conversion and carriage of these services in digital format. This can be accomplished using existing add-drop methods in unencrypted multiplexes. However, this requires the implementation of the unnecessary processes of de-multiplexing the original MPTS to form Single Program Transport Streams (SPTS), recovery of timing information for each of these streams, dropping the substituted SPTS, and re-multiplexing of the original retained streams along with the substituted streams. For the case of encrypted multiplexes it is not possible to substitute programs within the multiplex due to the fact that necessary timing information is not available in the clear.

SUMMARY

Provided are methods and systems for substituting programs within an existing MPTS. This can be achieved by overwriting replaced packets at the original MPTS transport rate, by recovering the transport rate and timing information of the replacement packets, and scheduling their retransmission based on available replaced packet locations in the MPTS. By maintaining the original MPTS transport clock, both re-multiplexing and re-time stamping of the original stream is avoided, thereby significantly reducing the complexity and cost of this operation, and enabling program substitution in encrypted multiplexes.

Additional advantages of the invention will be set forth in part in the description which follows or may be implicit in the practice of the invention. It is to be understood that both the foregoing general description and the following detailed description are exemplary and explanatory only and are not restrictive of the invention.

BRIEF DESCRIPTION OF THE DRAWINGS

The accompanying drawings, which are incorporated in and constitute a part of this specification, illustrate embodiments of the invention and together with the description, serve to explain the principles of the invention:

FIG. 3 illustrates an exemplary diagram of the disclosed multiplexing method;

DETAILED DESCRIPTION

Before the present methods and systems are disclosed and described, it is to be understood that this invention is not limited to specific methods or specific components, and as such may, of course, vary. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present invention may be understood more readily by reference to the following detailed description of preferred embodiments of the invention and the Examples included therein and to the Figures and their previous and following description.

Figure 1:
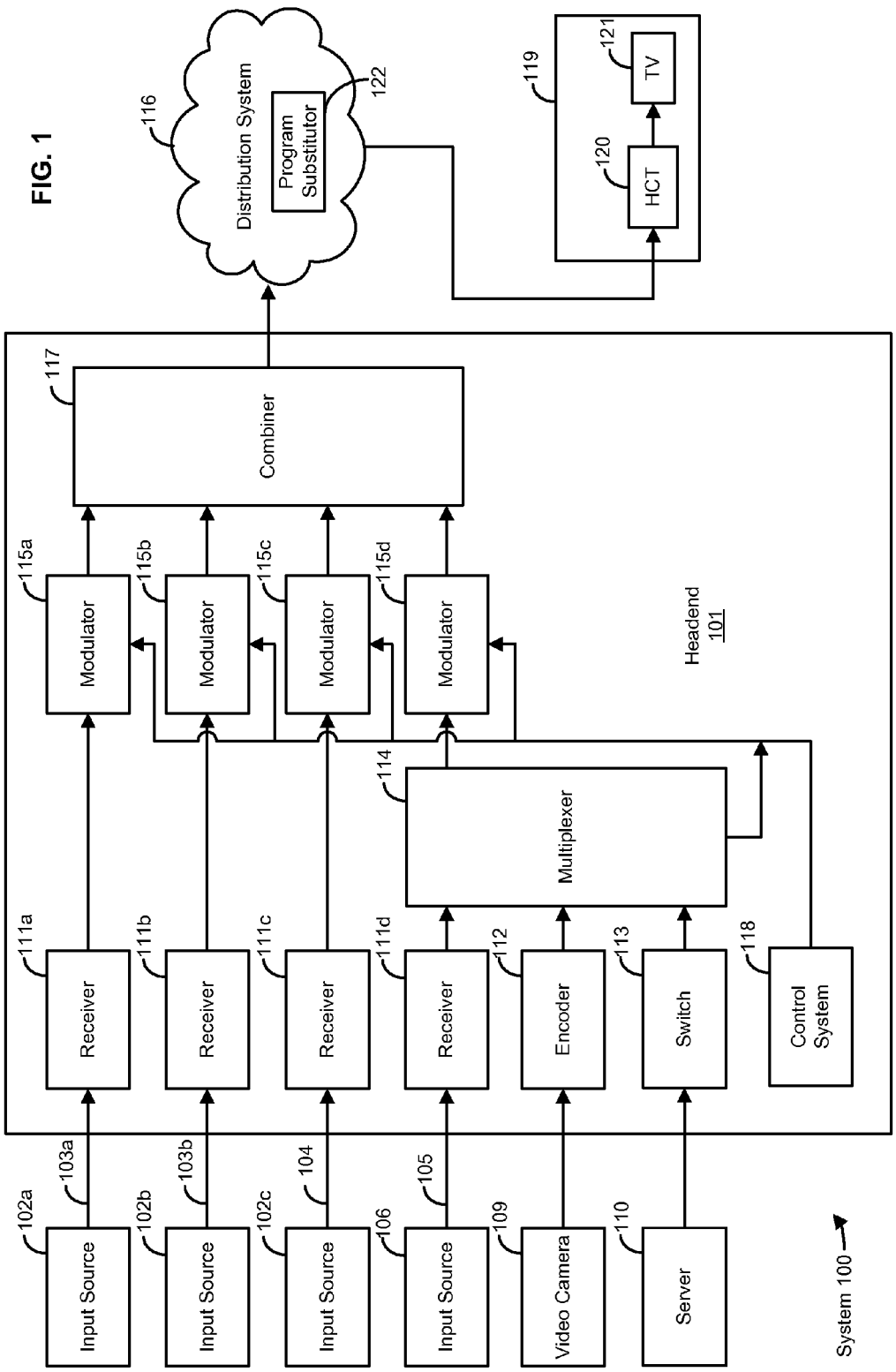
FIG. 1 illustrates an exemplary system in which embodiments of the present invention can operate.

FIG. 1 illustrates various aspects of an exemplary system in which the present invention can operate. The present invention relates to substituting programs within an existing multi program transport stream (MPTS). Those skilled in the art will appreciate that present invention may be used in systems that employ both digital and analog equipment.

The system 100 includes a headend 101, which receives input programming from multiple input sources. The headend 101 combines the programming from the various sources and distributes the programming to subscriber locations (e.g., subscriber location 119) via distribution system 116.

In a typical system, the headend 101 receives programming from a variety of sources 102a, 102b, 102c. The programming signals may be transmitted from the source to the headend 101 via a variety of transmission paths, including satellite 103a, 103b, and terrestrial broadcast 104. The headend 101 can also receive programming from a direct feed source 106 via a direct line 105. Other input sources include a video camera 109 or a server 110. The signals provided by the programming sources can include a single program or a multiplex that includes several programs.

The headend 101 includes a plurality of receivers 111a, 111b, 111c, 111d that are each associated with an input source. MPEG encoders such as encoder 112, are included for encoding such things as local programming or a video camera 109 feed. A switch 113 provides access to server 110, which can be a Pay-Per-View server, a data server, an internet router, a network system, or a phone system. Some of the signals may require additional processing, such as signal multiplexing prior to being modulated. Such multiplexing can be done by multiplexer (mux) 114.

The headend 101 contains a plurality of modulators, 115a, 115b, 115c, and 115d, for interfacing to the distribution system 116. The modulators convert the received programming information into a modulated output signal suitable for transmission over the distribution system 116. The output signals from the modulators are combined, using equipment such as a combiner 117, for input into the distribution system 116.

A control system 118 allows the television system operator to control and monitor the functions and performance of the television system 100. The control system 118 interfaces, monitors, and/or controls a variety of functions, including the channel lineup for the television system, billing for each subscriber, and conditional access for programming distributed to subscribers. Control system 118 provides input to the modulators for setting their operating parameters, such as system specific MPEG table packet organization or conditional access information. The control system 118 can be located at headend 101 or remotely.

The distribution system 116 distributes signals from the headend 101 to subscriber locations, such as subscriber location 119. The distribution system 116 can be an optical fiber network, a coaxial cable network, a hybrid fiber-coaxial network, a satellite system, or a direct broadcast system. Program substitutor 122 can be located within the distribution system 116 at any point between the headend 101 and the subscriber location 119 (such as an MDU). By way of example, the program substitutor 122 can be located in close proximity to subscriber location 119. There is a multitude of subscriber locations connected to distribution system 116. At subscriber location 119, a decoder 120, such as a home communications terminal (HCT) decodes the signals for display on a display device, such as on a television set (TV) 121 or a computer monitor. Those skilled in the art will appreciate that the signal can be decoded in a variety of equipment, including an HCT, a computer, a TV, a monitor, or satellite dish.

In an exemplary embodiment, the present invention can be located within one or more program substitutors 122. Program substitutors can comprise memory and one or more processors for performing the methods described herein.

The Moving Pictures Experts Group (MPEG) was established by the International Standards Organization (ISO) for the purpose of creating standards for digital audio/video compression. The MPEG experts created the MPEG-1 and MPEG-2 standards, with the MPEG-1 standard being a subset of the MPEG-2 standard. The combined MPEG-1 and MPEG-2 standards are hereinafter referred to as MPEG. In an MPEG encoded transmission, programming and other data are transmitted in packets, which collectively make up a transport stream. Additional information regarding transport stream packets, the composition of the transport stream, types of MPEG tables, and other aspects of the MPEG standards are described below. In an exemplary embodiment, the present invention employs MPEG packets. However, the present invention is not so limited, and can be implemented using other types of data.

The output of a single MPEG audio or video coder is called an elementary stream. An elementary stream is an endless near real-time signal. For convenience, the elementary stream may be broken into data blocks of manageable size, forming a packetized elementary stream (PES). These data blocks need header information to identify the start of the packets and must include time stamps because packetizing disrupts the time axis. For transmission and digital broadcasting, several programs and their associated PESs can be multiplexed into a multi program transport stream. A multi program transport stream has a program clock reference (PCR) mechanism that allows transmission of multiple clocks, one of which is selected and regenerated at the decoder.

A multi program transport stream is more than just a multiplex of audio and video PESs. In addition to the compressed audio, video and data, a transport stream includes metadata describing the bit stream. This includes the program association table (PAT) that lists every program in the multi program transport stream. Each entry in the PAT points to a program map table (PMT) that lists the elementary streams making up each program. Some programs will be open, but some programs may be subject to conditional access (encryption) and this information is also carried in the metadata. The transport stream consists of fixed-size data packets, each containing 188 bytes. Each packet carries a program identifier code (PID). Packets in the same elementary stream all have the same PID, so that the decoder (or a demultiplexer) can select the elementary stream(s) it wants and reject the remainder. Packet continuity counts ensure that every packet that is needed to decode a stream is received. A synchronization system is used so that decoders can correctly identify the beginning of each packet and deserialize the bit stream into words.

A program is a group of one or more PIDs that are related to each other. For instance, a multi program transport stream used in digital television might contain three programs, to represent three television channels. Suppose each channel consists of one video stream, one or two audio streams, and any necessary metadata. A receiver wishing to tune to a particular "channel" merely has to decode the payload of the PIDs associated with its program. It can discard the contents of all other PIDs.

The multi program transport stream carries many different programs and each may use a different compression factor and a bit rate that can change dynamically even though the overall bit rate stays constant. This behavior is called statistical multiplexing and it allows a program that is handling difficult material to borrow bandwidth from a program handling easy material. Each video PES can have a different number of audio and data PESs associated with it. Despite this flexibility, a decoder must be able to change from one program to the next and correctly select the appropriate audio and data channels. Some of the programs can be protected so that they can only be viewed by those who have paid a subscription or fee. The transport stream must contain Conditional Access (CA) information to administer this protection. The transport stream contains Program Specific Information (PSI) to handle these tasks.

Figure 2:
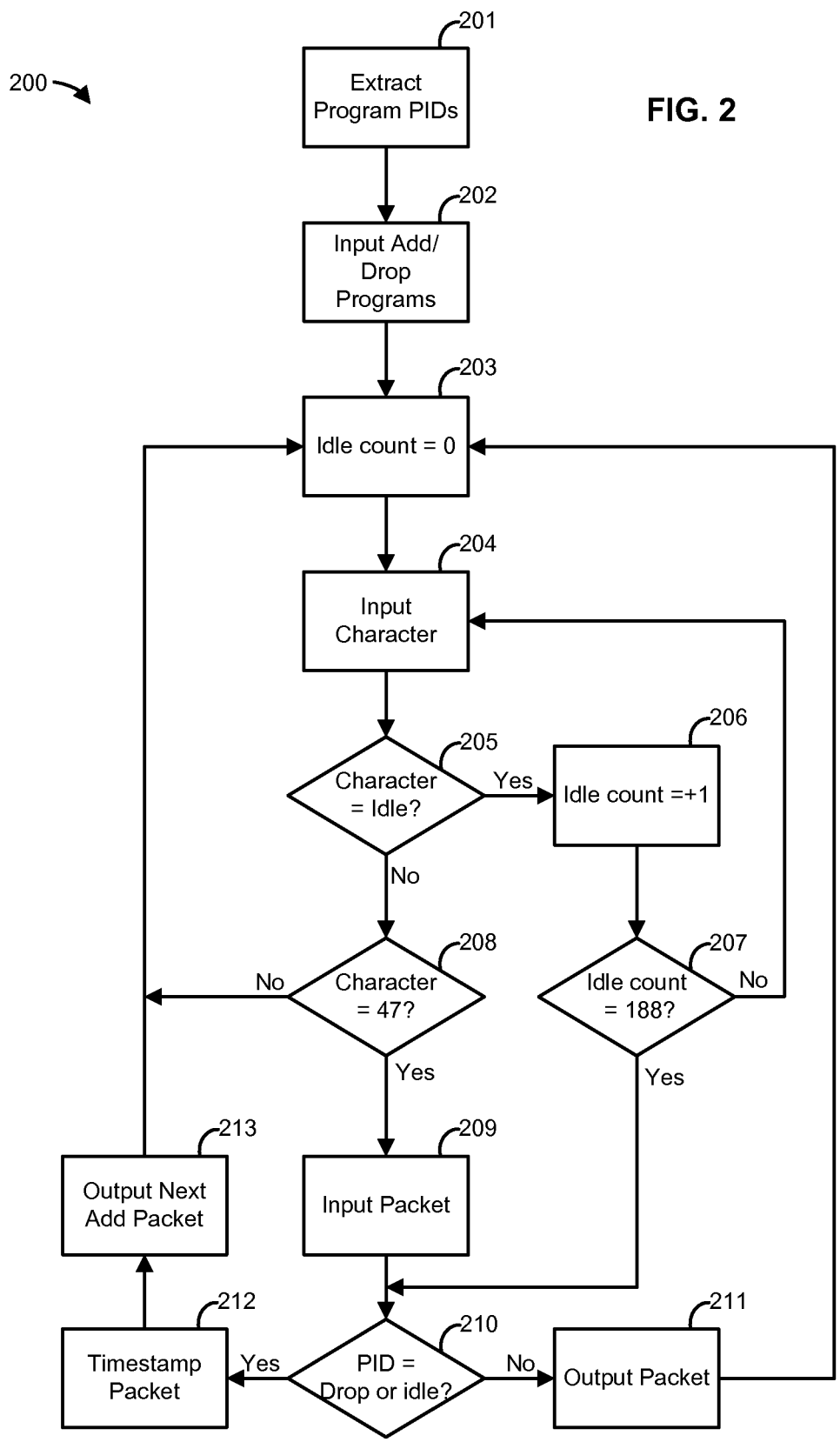
FIG. 2 is a flow chart of the disclosed multiplexing method.

An exemplary method 200 for substituting a program into an existing multi program transport stream is illustrated in FIG. 2. The method begins by parsing an input stream to determine the PIDs for packets belonging to a plurality of input programs in block 201. At block 202 the input programs to be replaced and the replacement programs are input from a configuration file or input device. This may be facilitated by displaying the program information determined at block 201. Replacement program packets can be inserted in dropped program packets identified by the PID or in 188 character blocks of idle characters. An idle character is a character transmitted to keep the line synchronized when there is no data being sent. The method can set an idle count to zero at block 203 and proceed to receive an input character at block 204.

At block 205, it can be determined if the input character is an idle character. If the input character is an idle character, the idle count can be incremented by one at block 206 and proceed to block 207. At block 207, it can be determined if the idle count is equal to 188, indicating a full packet. If the idle count is not equal to 188, the system can receive the next input character by returning to block 204. If at block 207, the idle count is equal to 188, the system can proceed to block 210, described below.

If, at block 205, it is determined that the input character is not an idle character, a determination can be made at block 208 if the input character is equal to "0x47", indicating the beginning of a packet. If it is determined that the input character is not equal to "0x47", the method can return to block 203 and reset the idle count to zero.

If the beginning of a packet is detected at block 208, a full packet (188 characters) can be input at block 209. The method can then proceed to block 210 and determine whether the received block of 188 characters is a packet corresponding to a program to be replaced, a block of 188 idle characters, or a packet corresponding to an input program that is not going to be replaced. If the determination corresponds to the former two cases, the next replacement packet is timestamped with the current time for that program at block 212, and output by 213. The method can then return to block 203 and reset the idle count to zero. If the determination at block 210 corresponds to the latter case, the input packet is output without modification at block 211. The method can then return to block 203 and reset the idle count to zero.

FIG. 3 illustrates another embodiment for substituting a program into an existing multi program transport stream. Open arrow heads within blocks are clocks typically used to synchronize state logic or transfer bits, or words, from one block to the next.

An MPTS Transport Stream and Transport Clock, (TSC), can be recovered from an input modulated MPTS by a Tuner QAM Demodulator (301). PAT and PMT information can be recovered from the transport stream by a Transport Stream Parser (302), and stored in a PSI Table (303). Once the PSI Table 303 is populated, a Comparator (305) can identify the program (PgmM) corresponding to the packet currently being output from a Packet Header Delay (304). A Packet Scheduler (308) can use this, and other, information to determine which program packet to select as a replacement by means of a Mux (308) for output to a QAM Modulator Up-converter (307).

Data is transferred from the Tuner QAM Demodulator (301) to the QAM Modulator Up-converter (307) and from inserted SPTS Output Fifos (310) using the Modulated MPTS Transport Clock, therefore, no timestamp adjustment needs to be performed on packets retained in the original MPTS. The inserted SPTS are assumed to be generated with asynchronous clocks, and transmitted to the multiplexer with some amount of packet jitter introduced either by a transport network, such as an IP network, or due to software latencies. In either case the actual transport rate for each program (TSC1) is determined by a de jitter Phase Lock Loop (PLL) comprising a De jitter Fifo (309) Level, low-pass filter (LPF) (313) and Voltage Controlled Oscillator (VCO) (312). The control input (TSC1) of the VCO (312) is directly related to the transport rate of the SPTS and is used by the Packet Scheduler (308) in calculating the required packet rate for that SPTS in the output MPTS. Since the SPTS packet transmission times do not correspond to their original arrival times due to de jitter and scheduling by the Packet Scheduler (308), the time stamps in those streams must be adjusted before being multiplexed into the MPTS output. This adjustment is performed using a reconstructed System Time Clock (STC1) (315) in the Timestamp Adjust (311). The STC is generated by the PLL comprising PCR Extract (314), LPF (316), VCO (317) and STC1 (315). The PLL control loop uses PCRs regularly extracted from the de-jittered SPTS to generate an error signal that is low-pass filtered to generate a VCO control voltage. Since each SPTS is generated from different asynchronous clocks, this circuit is repeated for each SPTS inserted into the MPTS. The Packet Scheduler (308) also uses the Output Fifo (310) Level to ensure that each SPTS is serviced at its transport rate in the event of TSC tracking errors due to transients in the input SPTS arrival rate.

Figure 4:
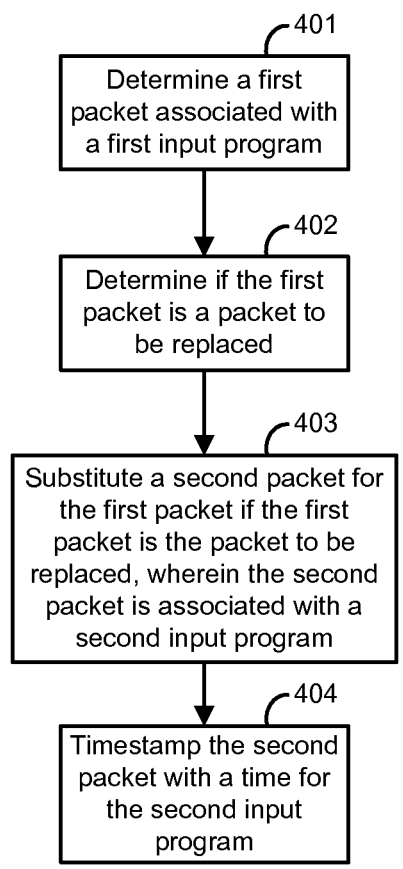
FIG. 4 illustrates an exemplary method for substituting a program in a multiple program transport stream (MPTS)

In one aspect, illustrated in FIG. 4, provided are methods for substituting a program in a MPTS, comprising determining a first packet associated with a first input program at 401, determining if the first packet is a packet to be replaced at 402, substituting a second packet for the first packet if the first packet is the packet to be replaced, wherein the second packet is associated with a second input program (SPTS1) at 403, and timestamping the second packet with a time for the second input program at 404. The methods can further comprising repeating 401-404 for a plurality of input programs.

Determining a first packet associated with a first input program can comprise determining a program identifier code (PID) for the first packet wherein the PID identifies the program to which the packet belongs.

Determining if the first packet is a packet to be replaced can comprise determining if the packet belongs to a program to be replaced based on the PID.

Determining if the first packet is a packet to be replaced can comprise determining program association table (PAT) and program map table (PMT) data from the MPTS and determining, from the PAT and PMT data, if the first packet corresponds to a program to be replaced.

The methods can further comprise outputting the MPTS comprising the second packet. Outputting the MPTS comprising the second packet can comprise determining a transport rate associated with the second input program and outputting the second packet at the transport rate.

Figure 5:
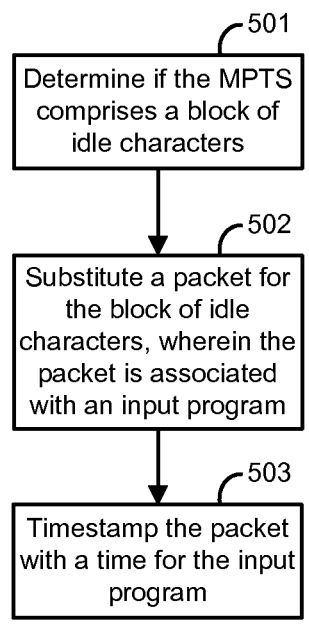
FIG. 5 illustrates another exemplary method for substituting a program in a MPTS.

In another aspect, illustrated in FIG. 5, provided are methods for substituting a program in a MPTS, comprising determining if the MPTS comprises a block of idle characters at 501, substituting a packet for the block of idle characters, wherein the packet is associated with an input program (SPTS1) at 502, and timestamping the packet with a time for the input program at 503. The methods can further comprise repeating 501-503 for a plurality of blocks of idle characters.

An idle character can be a character transmitted to keep an MPTS transmission line synchronized when there is no data being sent. Determining if the MPTS comprises a block of idle characters can comprise a. receiving a character of the MPTS, b. determining if the character is an idle character, and c. repeating a-b until a predetermined number of idle characters has been received. The predetermined number of idle characters can be, for example, 188.

The methods can further comprise outputting the MPTS comprising the packet. Outputting the MPTS comprising the packet can comprise determining a transport rate associated with the second input program and outputting the second packet at the transport rate.

Figure 6:
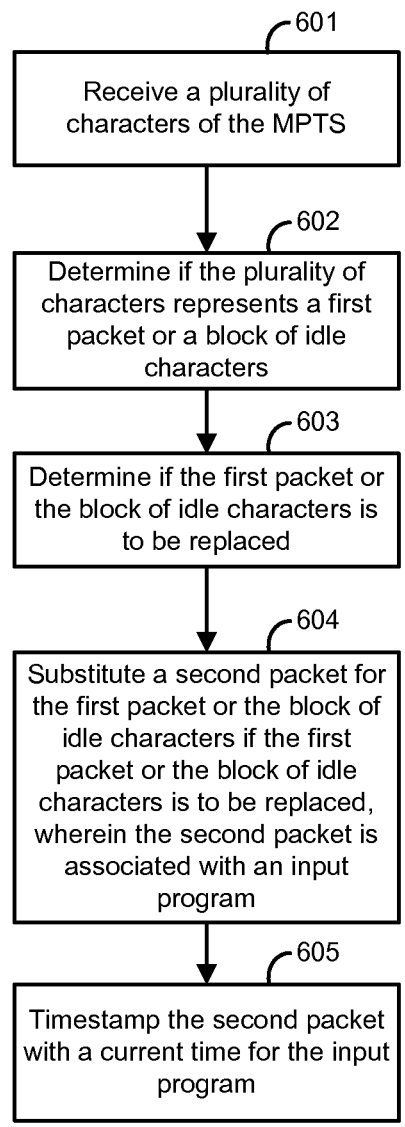
FIG. 6 illustrates another exemplary method for substituting a program in a MPTS.

In another aspect, illustrated in FIG. 6, provided are methods for substituting a program in a MPTS, comprising receiving a plurality of characters of the MPTS at 601, determining if the plurality of characters represents a first packet or a block of idle characters at 602, determining if the first packet or the block of idle characters is to be replaced at 603, substituting a second packet for the first packet or the block of idle characters if the first packet or the block of idle characters is to be replaced, wherein the second packet is associated with an input program (SPTS1) at 604, and timestamping the second packet with a current time for the input program at 605. The methods can further comprise repeating steps 601-605 for a plurality of blocks of idle characters and a plurality of packets.

An idle character can be a character transmitted to keep an MPTS transmission line synchronized when there is no data being sent. Determining if the plurality of characters represents a first packet or a block of idle characters can comprise determining if the plurality of characters is comprised of a predetermined number of idle characters or if the plurality of characters comprises a character indicating the beginning of a packet followed by a predetermined number of characters. The predetermined number of idle characters can be, for example, 188. The predetermined number of characters can be, for example, is 188.

The methods can further comprise outputting the MPTS comprising the second packet. Outputting the MPTS comprising the second packet can comprise determining a transport rate associated with the second input program and outputting the second packet at the transport rate.

Figure 7:
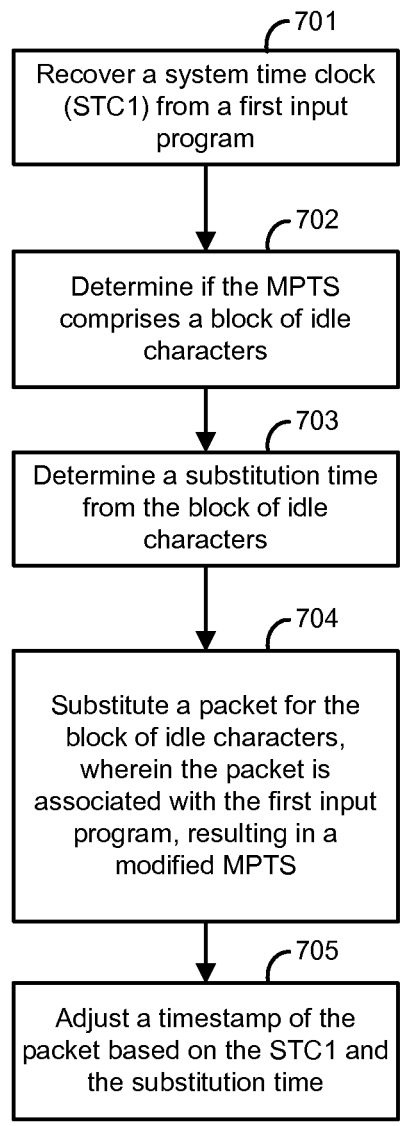
FIG. 7 illustrates another exemplary method for substituting a program in a MPTS.

In another aspect, illustrated in FIG. 7, provided are methods for substituting a program in a MPTS, comprising recovering a system time clock (STC1) from a first input program (SPTS1) at 701, determining if the MPTS comprises a block of idle characters at 702, determining a substitution time from the block of idle characters at 703, substituting a packet for the block of idle characters, wherein the packet is associated with the first input program, resulting in a modified MPTS at 704, and adjusting a timestamp of the packet based on the STC1 and the substitution time at 705. The methods can further comprise repeating steps 702-705 for a plurality of blocks of idle characters.

Recovering a system time clock (STC1) from a first input program (SPTS1) can comprise identifying a packet in the first input program having a time reference stamp, initializing a system time clock (STC1) with the value of the time reference stamp, comparing subsequent packet time reference stamps from the first input program with the value of the system time clock (STC1), and adjusting the rate of the system time clock to correspond with the time reference stamps. The STC can be recovered from the program that is being inserted into the MPTS. Each program in an MPTS can have packets (called PCR packets) that have time stamps synchronous with the video frame rate for the corresponding program. These PCRs can be included periodically for each program at a maximum required spacing (for example, 100 mS or 40 mS depending on the application) and can be a snapshot of the STC at the transmission time of the PCR packet. So when a packet from the new program is inserted into the MPTS, its PCR can be stamped with a snapshot of its (recovered) STC. The replaced packet (or null characters) can be thrown away and without regardt to the STC corresponding to that program.

An idle character can be a character transmitted to keep an MPTS transmission line synchronized when there is no data being sent. Determining if the MPTS comprises a block of idle characters can comprise a. receiving a character of the MPTS, b. determining if the character is an idle character, and c. repeating a-b until a predetermined number of idle characters has been received. The predetermined number of idle characters can be, for example, 188.

Determining a substitution time from the block of idle characters can comprise determining an occupancy of an output fifo (first in first out) level (SPL1) of the first input program and determining the substitution time as the transmission time of the null packets if the output fifo level is greater than one half full. If the fifo goes above one half occupancy, the transmission rate of inserted program packets is running too slow, so available slots in the MPTS are taken advantage of to increase the rate of this program in the MPTS. If the fifo falls below one half occupancy, then an available slot will not be used (in the case of program packets rather than idle characters the packet must be set to a null packet (does not belong to any program)). The inserted packet can be time stamped with a PCR, determined from the STC, at a rate that maintains the required PCR spacing.

The methods can further comprise outputting the MPTS comprising the packet. Outputting the MPTS comprising the packet can comprise determining a transport rate associated with the second input program and outputting the packet at the transport rate.

Figure 8:
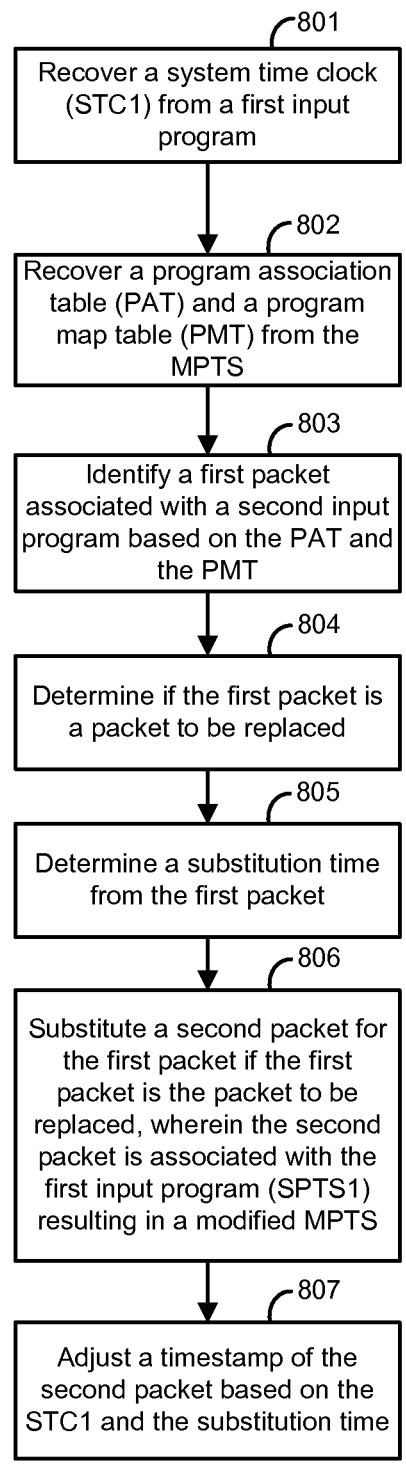
FIG. 8 illustrates another exemplary method for substituting a program in a MPTS.

In yet another aspect, illustrated in FIG. 8, provided are methods for substituting a program in a MPTS, comprising recovering a system time clock (STC1) from a first input program at 801, recovering a program association table (PAT) and a program map table (PMT) from the MPTS at 802, identifying a first packet associated with a second input program based on the PAT and the PMT at 803, determining if the first packet is a packet to be replaced at 804, determining a substitution time from the first packet at 805, substituting a second packet for the first packet if the first packet is the packet to be replaced, wherein the second packet is associated with the first input program (SPTS1) resulting in a modified MPTS at 806, and adjusting a timestamp of the second packet based on the STC1 and the substitution time at 807. The methods can further comprise repeating steps 803-807 for a plurality of packets.

Recovering a system time clock (STC1) from a first input program (SPTS1) can comprise identifying a packet in the first input program having a time reference stamp, initializing a system time clock (STC1) with the value of the time reference stamp, comparing subsequent packet time reference stamps from the first input program with the value of the system time clock (STC1), and adjusting the rate of the system time clock to correspond with the time reference stamps.

Determining a substitution time from the first packet can comprise determining an occupancy of an output fifo (first in first out) level (SPL1) of the first input program and determining the substitution time as the transmission time of the null packets if the output fifo level is greater than one half full.

The methods can further comprise outputting the MPTS comprising the second packet. Outputting the MPTS comprising the second packet can comprise determining a transport rate associated with the second input program and outputting the second packet at the transport rate.

Figure 9:
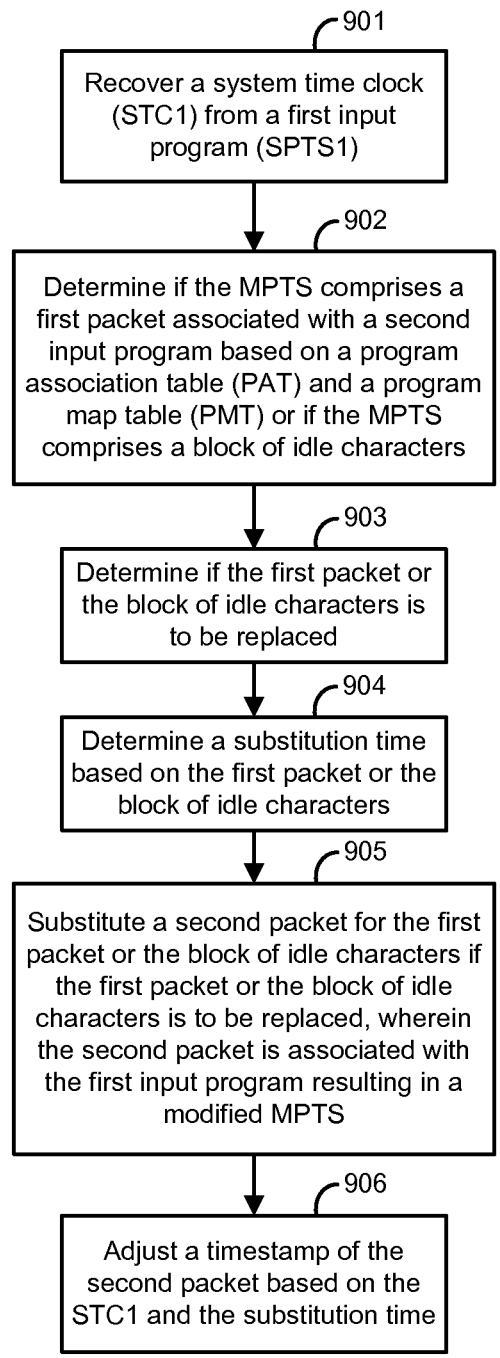
FIG. 9 illustrates another exemplary method for substituting a program in a MPTS.

In another aspect, illustrated in FIG. 9, provided are methods for substituting a program in a MPTS, comprising recovering a system time clock (STC1) from a first input program (SPTS1) at 901, determining if the MPTS comprises a first packet associated with a second input program based on a program association table (PAT) and a program map table (PMT) or if the MPTS comprises a block of idle characters at 902, determining if the first packet or the block of idle characters is to be replaced at 903, determining a substitution time based on the first packet or the block of idle characters at 904, substituting a second packet for the first packet or the block of idle characters if the first packet or the block of idle characters is to be replaced, wherein the second packet is associated with the first input program resulting in a modified MPTS at 905, and adjusting a timestamp of the second packet based on the STC1 and the substitution time at 906.

Recovering a system time clock (STC1) from a first input program (SPTS1) can comprise identifying a packet in the first input program having a time reference stamp, initializing a system time clock (STC1) with the value of the time reference stamp, comparing subsequent packet time reference stamps from the first input program with the value of the system time clock (STC1), and adjusting the rate of the system time clock to correspond with the time reference stamps.

Determining a substitution time from the first packet can comprise determining an occupancy of an output fifo (first in first out) level (SPL1) of the first input program and determining the substitution time as the transmission time of the null packets if the output fifo level is greater than one half full.

The methods can further comprise outputting the MPTS comprising the second packet. Outputting the MPTS comprising the second packet can comprise determining a transport rate associated with the second input program and outputting the second packet at the transport rate.

An implementation of the methods disclosed herein can be stored on or transmitted across some form of computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any method or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The processing of the disclosed system and method of the present invention can be performed by software components. The disclosed system and method can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed method can also be practiced in grid-based and distributed computing environments where tasks are performed by remote processing devices that are linked through a communications network. In a distributed computing environment, program modules can be located in both local and remote computer storage media including memory storage devices.

While this invention has been described in connection with preferred embodiments and specific examples, it is not intended that the scope of the invention be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

The invention claimed is:

1. A computer-implemented method for substituting a program in a multiple program transport stream (MPTS), comprising:
   a. identifying at a stream processor a first previously populated packet associated with a first input single program transport stream residing within a previously populated multiple program transport stream;
   b. determining at the stream processor if the first previously populated packet is associated with a single program transport stream to be replaced;
   c. substituting a replacement packet for the first previously populated packet using the stream processor if it is determined that the first previously populated packet is associated with a single program transport stream to be replaced, wherein the replacement packet is associated with a replacement input program (SPTS 1); and
   d. applying a timestamp at the stream processor to the replacement packet with a timing reference associated with the replacement input program.

2. The method of claim 1, wherein determining a first populated packet associated with a first input single program transport stream comprises determining a program identifier code (PID) for the first populated packet wherein the PID identifies the program to which the packet belongs.

3. The method of claim 2, wherein determining if the first populated packet is associated with a single program transport stream to be replaced comprises determining if the first populated packet belongs to a single program transport stream to be replaced based on the PID.

4. The method of claim 1, wherein determining if the first populated packet is a packet to be replaced comprises:

determining program association table (PAT) and program map table (PMT) data from the MPTS; and determining, from the PAT and PMT data, if the first packet corresponds to a single program transport stream to be replaced.

5. The method of claim 1, further comprising outputting the MPTS comprising the replacement packet.

6. The method of claim 5, wherein outputting the MPTS comprising the replacement packet comprises:

determining a transport rate associated with the replacement single program transport stream; and outputting the replacement packet at the transport rate.

7. The method of claim 1, further comprising repeating steps a-d for a plurality of previously populated input programs carried by the previously populated multiple program transport stream.

8. A computer-implemented method for substituting a program in a multiple program transport stream (MPTS), comprising:

a. determining using a stream processor if the MPTS comprises a block of idle characters;

b. substituting a packet for the block of idle characters using the stream processor, wherein the packet is associated with an input single program transport stream (SPTS 1); and c. timestamping the substituted packet with a timing reference associated with the input program using the stream processor.

9. The method of claim 8, wherein idle characters are transmitted to keep an MPTS transmission line synchronized when there is no data being sent.

10. The method of claim 8, wherein determining if the MPTS comprises a block of idle characters comprises:

a. receiving a character of the MPTS;

b. determining if the character is an idle character; and c. repeating a-b until a predetermined number of idle characters has been received.

11. The method of claim 10, wherein the predetermined number of idle characters comprises the size of the substituted packet for the input single program transport stream.

12. The method of claim 8, further comprising outputting the MPTS comprising the substituted packet.

13. The method of claim 12, wherein outputting the MPTS comprising the packet comprises:

determining a transport rate associated with the input single program transport stream; and outputting the substituted packet at the transport rate.

14. The method of claim 8, further comprising repeating steps a-c for a plurality of blocks of idle characters.

15. A computer-implemented method for substituting a program in a multiple program transport stream (MPTS), comprising:

a. receiving a plurality of characters of the MPTS at a stream processor;

b. determining if the plurality of characters represents a first packet or a block of idle characters using the stream processor;

c. determining if the first packet or the block of idle characters is to be replaced using the stream processor;

d. based upon determining the first packet or block of idle character is to be replaced, substituting a replacement packet for the first packet or the block of idle characters using the stream processor, wherein the second packet is associated with an input program (SPTS 1); and e. timestamping the replacement packet with a current timing reference for the input program using the stream processor.

16. The method of claim 15, wherein idle characters are transmitted to keep an MPTS transmission line synchronized when there is no data being sent.

17. The method of claim 15, wherein determining if the plurality of characters represents a first packet or a block of idle characters comprises determining if the plurality of characters comprises a predetermined number of idle characters or if the plurality of characters comprises a character indicating the beginning of a packet followed by a predetermined number of characters.

18. The method of claim 15, further comprising outputting the MPTS comprising the replacement packet.

19. The method of claim 18, wherein outputting the MPTS comprising the replacement packet comprises:

determining a transport rate associated with the input program; and outputting the replacement packet at the transport rate.

20. The method of claim 15, further comprising repeating steps a-e for a plurality of blocks of idle characters and a plurality of packets.

21. A method for substituting a program in a multiple program transport stream (MPTS), comprising:

a. recovering a system time clock (STe1) from a first input program (SPTS1) at a stream processor;

b. determining at the stream processor if the MPTS includes a block of idle characters;

c. determining a substitution time from the block of idle characters at the stream processor;

d. substituting a packet for the block of idle characters at the stream processor, wherein the packet is associated with the first input program, resulting in a modified MPTS; and e. adjusting a timestamp of the substituted packet at the stream processor based on the STe1 and the substitution time.

22. The method of claim 21, wherein recovering a system time clock (STe1) from a first input program (SPTS1) comprises:

a. identifying a packet in the first input program having a time reference stamp;

b. initializing a system time clock (STe1) with the value of the time reference stamp;

c. comparing subsequent packet time reference stamps from the first input program with the value of the system time clock (STe1); and d. adjusting the rate of the system time clock to correspond with the time reference stamps.

23. The method of claim 21, wherein idle characters are transmitted to keep an MPTS transmission line synchronized when there is no data being sent.

24. The method of claim 21, wherein determining if the MPTS comprises a block of idle characters comprises:

a. receiving a character of the MPTS;

b. determining if the character is an idle character; and c. repeating a-b until a predetermined number of idle characters has been received.

25. The method of claim 24, wherein the predetermined number of idle characters is 188.

26. The method of claim 21, wherein determining a substitution time from the block of idle characters comprises:

a. determining an occupancy of an output fifo level (SPL1) of the first input program; and b. determining the substitution time as the transmission time of the null packets if the output fifo level is greater than one half full.

27. The method of claim 21, further comprising outputting the MPTS comprising the substituted packet.

28. The method of claim 27, wherein outputting the MPTS comprising the substituted packet comprises:
   determining a transport rate associated with a substituted input program; and
   outputting the substituted packet at the transport rate.

29. The method of claim 21, further comprising repeating steps b-e for a plurality of blocks of idle characters.

30. A computer-implemented method for substituting a program in a multiple program transport stream (MPTS), comprising:
   a. recovering a system time clock (STe1) from a first input program at a stream processor;
   b. recovering a program association table (PAT) and a program map table (PMT) from the MPTS at the stream processor;
   c. identifying a first packet associated with a second input program based on the PAT and the PMT at the stream processor;
   d. determining if the first packet is a packet to be replaced at the stream processor;
   e. determining a substitution time from the first packet at the stream processor;
   f. substituting a second packet for the first packet if the first packet is the packet to be replaced at the stream processor, wherein the second packet is associated with the first input program (SPTS 1) resulting in a modified MPTS; and
   g. adjusting a timestamp of the second packet based on the STe1 and the substitution time at the stream processor.

31. The method of claim 30, wherein recovering a system time clock (STe1) from a first input program (SPTS 1) comprises:
   a. identifying a packet in the first input program having a time reference stamp;
   b. initializing a system time clock (STe1) with the value of the time reference stamp;
   c. comparing subsequent packet time reference stamps from the first input program with the value of the system time clock (STe1); and
   d. adjusting the rate of the system time clock to correspond with the time reference stamps.

32. The method of claim 30, wherein determining a substitution time from the first packet comprises:
   a. determining an occupancy of an output fifo level (SPL 1) of the first input program; and
   b. determining the substitution time as the transmission time of the null packets if the output fifo level is greater than one half full.

33. The method of claim 30, further comprising outputting the MPTS comprising the second packet.

34. The method of claim 33, wherein outputting the MPTS comprising the second packet comprises:
   determining a transport rate associated with the second input program; and
   outputting the second packet at the transport rate.

35. The method of claim 30, further comprising repeating steps c-g for a plurality of packets.

36. A computer-implemented method for substituting a program in a multiple program transport stream (MPTS), comprising:
   recovering a system time clock (STC1) from a first input program (SPTS1) at the stream processor;
   determining if the MPTS comprises a first packet associated with a second input program at the stream processor based on a program association table (PAT) and a program map table (PMT) or if the MPTS comprises a block of idle characters;
   determining if the first packet or the block of idle characters is to be replaced at the stream processor;
   determining a substitution time based on the first packet or the block of idle characters at the stream processor;
   substituting a second packet for the first packet or the block of idle characters at the stream processor if the first packet or the block of idle characters is to be replaced, wherein the second packet is associated with the first input program and substituting results in a modified MPTS; and
   adjusting a timestamp of the second packet based on the STC1 and the substitution time at the stream processor.

37. A system for substituting a program in a multiple program transport stream (MPTS), comprising:
   a program substitutor, wherein the program substitutor comprises a memory, configured for storing program data, and
   a processor, configured for performing steps comprising
      a. determining a first packet associated with a first input program included within a previously populated multiple program transport stream,
      b. determining whether the first packet is a packet to be replaced based on the program data,
      c. substituting a second packet for the first packet if the first packet is the packet to be replaced, wherein the second packet is associated with a second input program (SPTS 1), and
      d. timestamping the second packet with a timing reference associated with the second input program.

38. The system of claim 37, wherein determining a first packet associated with a first input program comprises determining a program identifier code (PID) for the first packet wherein the PID identifies the program to which the packet belongs and storing the PID as program data.

39. The system of claim 38, wherein determining whether the first packet is a packet to be replaced based on the program data comprises determining if the packet belongs to a program to be replaced based on the PID.

40. The system of claim 37, wherein determining whether the first packet is a packet to be replaced based on the program data comprises:
   determining program association table (PAT) and program map table (PMT) data from the MPTS;
   storing the PAT and PMT data as program data; and
   determining, whether the first packet corresponds to a program to be replaced based on the PAT and PMT data.

41. The system of claim 37, further comprising repeating steps a-d for a plurality of input programs.

42. The system of claim 37, further comprising a tuner QAM demodulator for receiving the MPTS and providing the MPTS to the program substitutor.

43. The system of claim 37, further comprising a transport stream parser for recovering PAT and PMT data and providing the PAT and PMT data to the program substitutor.

44. The system of claim 37, further comprising a packet scheduler configured for determining a transport rate associated with the second input program.

45. The system of claim 37, further comprising a multiplexer for outputting the MPTS.

46. A system for substituting a program in a multiple program transport stream (MPTS), comprising:
   a program substitutor, wherein the program substitutor comprises a memory, configured for storing program data, and
   a processor, configured for performing steps comprising
      a. determining if the MPTS comprises a block of idle characters of a predetermined size;

b. substituting a packet of a predetermined size associated with an input program (SPTS 1) for the block of idle characters of the predetermined size; and c. timestamping the packet with a timing reference associated with the input program.

47. The system of claim 46, wherein an idle character is a character transmitted to keep an MPTS transmission line synchronized when there is no data being sent.

48. The system of claim 46, wherein determining if the MPTS comprises a block of idle characters of a predetermined size comprises:

a. receiving a character of the MPTS;

b. determining if the character is an idle character; and c. repeating a-b until a predetermined number of idle characters has been received.

49. The system of claim 48, wherein the predetermined number of idle characters is 188.

50. The system of claim 46, further comprising repeating steps a-c for a plurality of blocks of idle characters.

51. The system of claim 46, further comprising a tuner QAM demodulator for receiving the MPTS and providing the MPTS to the program substitutor.

52. The system of claim 46, further comprising a transport stream parser for recovering PAT and PMT data and providing the PAT and PMT data to the program substitutor.

53. The system of claim 46, further comprising a packet scheduler configured for determining a transport rate associated with the input program.

54. The system of claim 46, further comprising a multiplexer for outputting the MPTS.

\* \* \* \* \*